US011805213B2

(12) United States Patent
Akazawa

(10) Patent No.: US 11,805,213 B2
(45) Date of Patent: Oct. 31, 2023

(54) IMAGE FORMING SYSTEM AND WIRELESS OPERATION DEVICE

(71) Applicant: CANON KABUSHIKI KAISHA, Tokyo (JP)

(72) Inventor: Minoru Akazawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/464,160

(22) Filed: Sep. 1, 2021

(65) Prior Publication Data

US 2022/0103711 A1 Mar. 31, 2022

(30) Foreign Application Priority Data

Sep. 30, 2020 (JP) ................................ 2020-164538

(51) Int. Cl.
*H04N 1/00* (2006.01)
*G06F 1/3212* (2019.01)

(52) U.S. Cl.
CPC ....... *H04N 1/00896* (2013.01); *G06F 1/3212* (2013.01); *H04N 1/00899* (2013.01)

(58) Field of Classification Search
CPC ................................................. H04N 1/00896
USPC ........................................................ 358/1.13
See application file for complete search history.

(56) References Cited

U.S. PATENT DOCUMENTS

2015/0323981 A1* 11/2015 Yarvis .................. G06F 1/3212 713/323
2019/0182388 A1 6/2019 Kishimoto
2019/0235594 A1* 8/2019 Senba .................. G06F 1/3284
2019/0379796 A1 12/2019 Sugita
2020/0393927 A1 12/2020 Akazawa

FOREIGN PATENT DOCUMENTS

JP 2019134267 A 8/2019

OTHER PUBLICATIONS

U.S. Appl. No. 17/387,677, filed Jul. 28, 2021, by Takehito Utsunomiya et al.

* cited by examiner

*Primary Examiner* — Jacky X Zheng
(74) *Attorney, Agent, or Firm* — VENABLE LLP

(57) ABSTRACT

An image forming system comprising: an image forming apparatus capable of transitioning between a standby mode and a sleep mode; and a wireless operation device capable of wireless communication with the image forming apparatus, the wireless operation device including: a display; a battery configured to perform power supply to the display; and a controller configured to control the power supply from the battery to the display, wherein, in response to transition of the image forming apparatus from the standby mode to the sleep mode with a predetermined amount of power being supplied from the battery to the display, the controller makes a supply amount of power from the battery to the display less than the predetermined amount.

18 Claims, 12 Drawing Sheets

IMAGE FORMING SYSTEM AND WIRELESS OPERATION DEVICE

BACKGROUND OF THE INVENTION

Field of the Invention

The present invention relates to an image forming system including an image forming apparatus and a wireless operation device which operates the image forming apparatus via wireless communication.

Description of the Related Art

Conventionally, widely known has been an image forming apparatus including an operation portion enabling settings regarding image forming, such as the size of a sheet according to image forming and the number of sheets for image forming, in response to an operation from a user.

US 2019/0235594 discloses an operation portion (wireless operation unit) detachable from an image forming apparatus. Information input to the wireless operation unit by a user at a position remote from the image forming apparatus is transmitted to the image forming apparatus via wireless communication. Japanese Patent Application Laid-Open No. 2019-134267 discloses a wireless operation unit enabling, in response to an operation from a user, the operation mode of an image forming apparatus to transition from the standby mode to the power-saving mode.

However, according to Japanese Patent Application Laid-Open No. 2019-134267, the operation mode of the wireless operation unit does not transition along with transition of the operation mode of the image forming apparatus. That is, although the image forming apparatus transitions from the standby mode to the power-saving mode, the wireless operation unit remains in the standby mode. Because the wireless operation unit is driven by a battery, desirably, unnecessary power consumption is inhibited.

SUMMARY OF THE INVENTION

According to a representative configuration of the present invention, provided is an image forming system comprising:

- an image forming apparatus including an image forming unit configured to form an image on a sheet, the image forming apparatus being configured to accept an execution signal for the image forming unit to perform image forming, the image forming apparatus being capable of transitioning between a standby mode which is a power state enabling image forming to be performed in response to acceptance of the execution signal and a sleep mode which is a power state less in power consumption than the standby mode; and
- a wireless operation device configured to accept an operation from a user, the wireless operation device being capable of wireless communication with the image forming apparatus,
- the wireless operation device including:
- a display configured to display an image;
- a battery configured to perform power supply to the display such that the display lights up; and
- a controller configured to control the power supply from the battery to the display,
- wherein, in response to transition of the image forming apparatus from the standby mode to the sleep mode with a predetermined amount of power being supplied from the battery to the display, the controller makes a supply amount of power from the battery to the display less than the predetermined amount.

Further features of the present invention will become apparent from the following description of exemplary embodiments with reference to the attached drawings.

DESCRIPTION OF THE EMBODIMENTS

First Embodiment

<Image Forming Apparatus>

The entire configuration of an image forming apparatus according to a first embodiment of the present invention will be described below together with the operation thereof at the time of image forming, with reference to the drawings. Note that, unless otherwise specified, the dimensions, material, and shape of each of the following constituent components and the relative arrangement thereof should not be construed to limit the scope of the invention.

Figure 1:
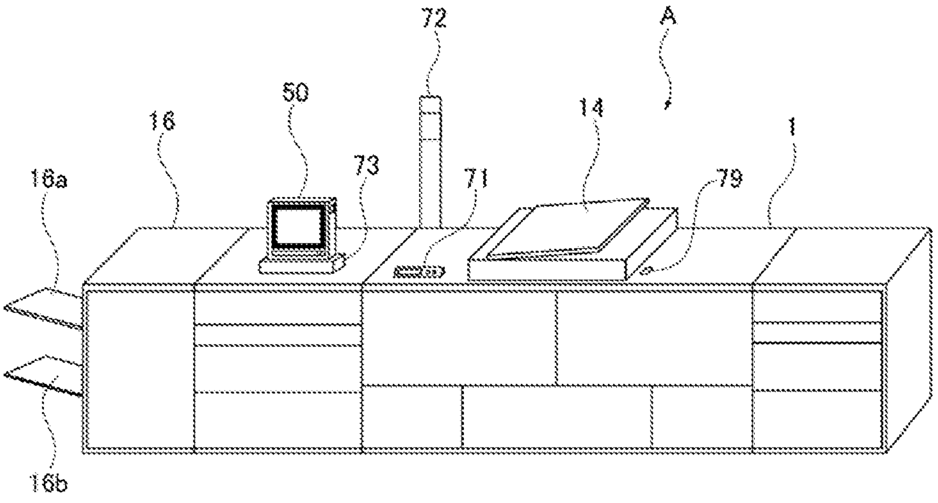
FIG. 1 is a schematic perspective view of an image forming system.

FIG. 1 is a schematic perspective view of an image forming system A equipped with the image forming apparatus 1. As illustrated in FIG. 1, the image forming system A includes the image forming apparatus 1 which forms an image on a sheet S, and a postprocessing apparatus 16 which performs postprocessing, such as stapling, punching, or binding, to the sheet S having the image formed by the image forming apparatus 1. The image forming apparatus 1 has an upper portion provided with a reader 14 which optically reads an image of an original placed on a glass face not illustrated and converts the image into image data.

The image forming apparatus 1 includes a seesaw-type main power switch 79 which switches main power between on and off. The image forming apparatus 1 further includes a display panel 71 which displays a lamp or an error code to notify a user of the state of the image forming apparatus 1, such as image forming processing in operation, suspension due to an error, or on standby. The image forming apparatus 1 further includes a tower-type lamp 72 which turns on, off, or on and off its light source, to notify the user at a distance of the state of the image forming apparatus 1.

Figure 5:
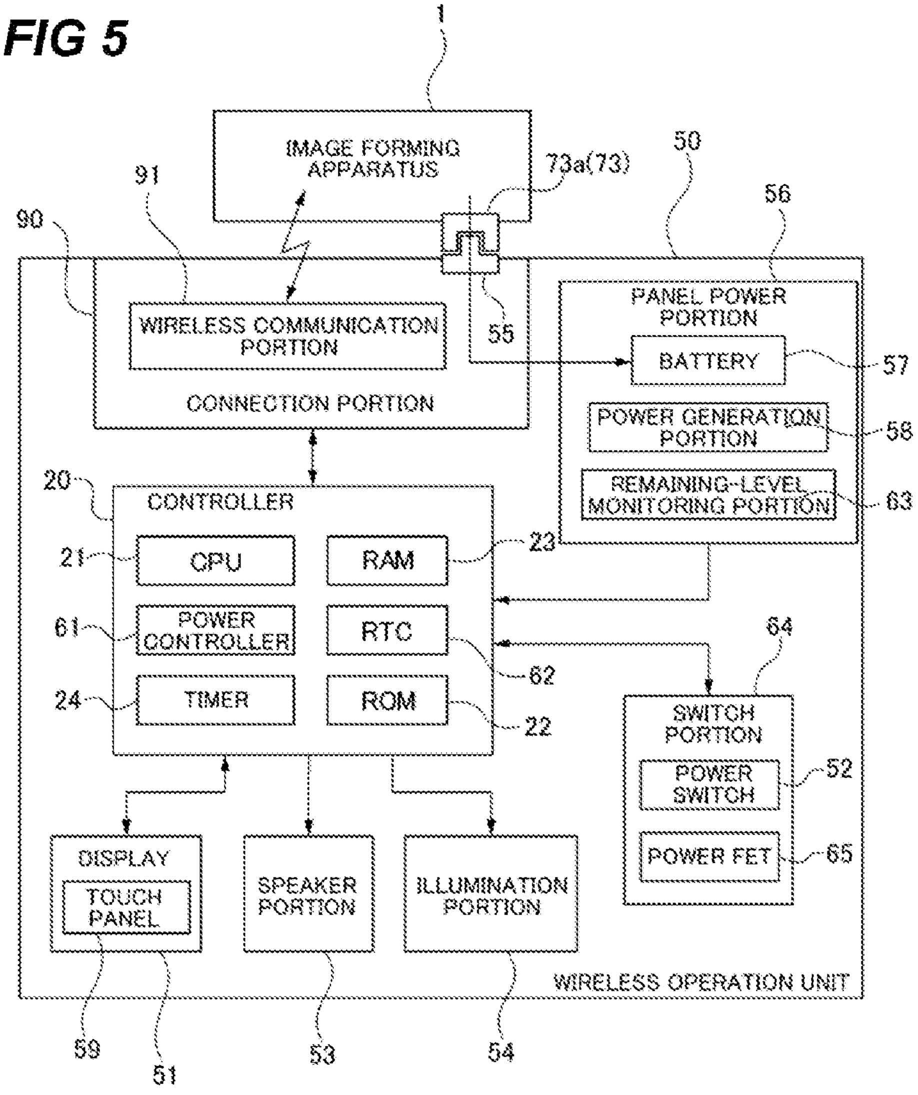
FIG. 5 is a block diagram of the system configuration of the wireless operation unit.

The image forming apparatus 1 further includes a wireless operation unit 50 (remote operation portion or wireless operation device) detachably attachable to a panel mount portion 73 (mount portion). The wireless operation unit 50 is capable of wireless communication with the image forming apparatus 1, enabling an operation at a position remote from the image forming apparatus 1. The wireless operation unit 50 serves as a device dedicated to the image forming apparatus 1. That is, the wireless operation unit 50 corresponds to a device manufactured for use in an image forming apparatus, unlike a mobile terminal, such as a commercially available tablet terminal, on which a dedicated application is installed. In response to mounting of the wireless operation unit 50 on the panel mount portion 73, a charging connector 55 of the wireless operation unit 50 (FIG. 2B) is connected to a feeding connector 73*a* of the panel mount portion 73 (FIG. 5). Thus, the image forming apparatus 1 detects the connection of the wireless operation unit 50, so that charging is performed from the image forming apparatus 1 to a battery 57 in the wireless operation unit 50 (FIG. 5). The panel mount portion 73 serves as a dedicated dock enabling mounting and charging of the wireless operation unit 50.

Figure 2A:
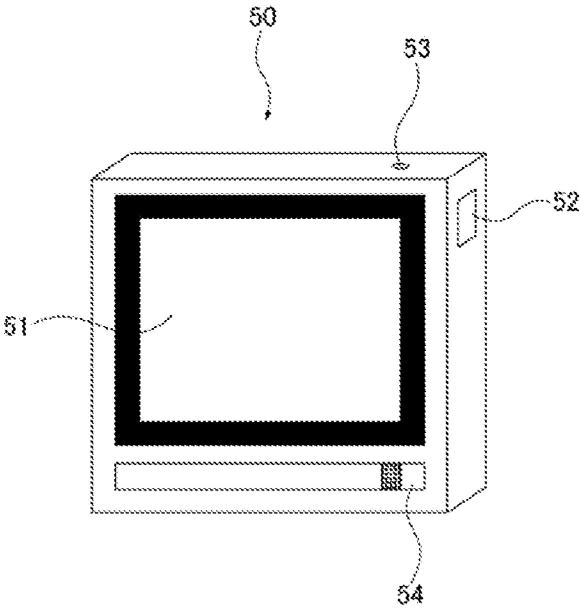
FIGS. 2A and 2B are schematic perspective views of a wireless operation unit.
Figure 2B:
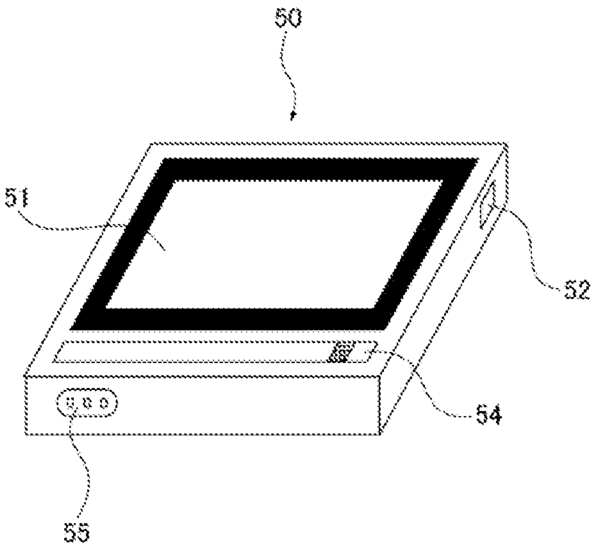

FIGS. 2A and 2B are schematic perspective views of the wireless operation unit 50. As illustrated in FIGS. 2A and 2B, the wireless operation unit 50 includes a power switch 52 which switches power to the wireless operation unit 50 between on and off, a speaker portion 53 which outputs sound, and an illumination portion 54 which includes an LED and turns on, off, or on and off the LED to issue notice of the state of the wireless operation unit 50.

The wireless operation unit 50 further includes a touch panel display 51 in which a display portion which displays an image is combined with an operation portion enabling input of information. The user touches a finger to a key displayed on the display 51, to input e.g., a numerical value, so that a setting regarding image forming, such as a setting in the number of sheets for image forming or a setting in the size of a sheet S, or a setting regarding image reading, such as a setting in the size of an original, can be made. Note that, in the present embodiment, given has been the wireless operation unit 50 equipped with the touch panel display 51, but the present invention is not limited to this. Thus, as the operation portion enabling input of information, hardware keys, such as a numeric keypad and a reset key, may be provided separately.

The display 51 in the present embodiment is a liquid crystal display. That is, a backlight is turned on by power supplied from the battery 57 to be described below, so that the display 51 brightens up. Hereinafter, a state where power is being supplied to the display means a state where the battery is supplying power to the backlight. Note that, in a case where an organic EL display is used, such a backlight as above is not present. In this case, a state where power is being supplied to the display means a state where the battery is supplying power to the organic EL material.

Figure 3:
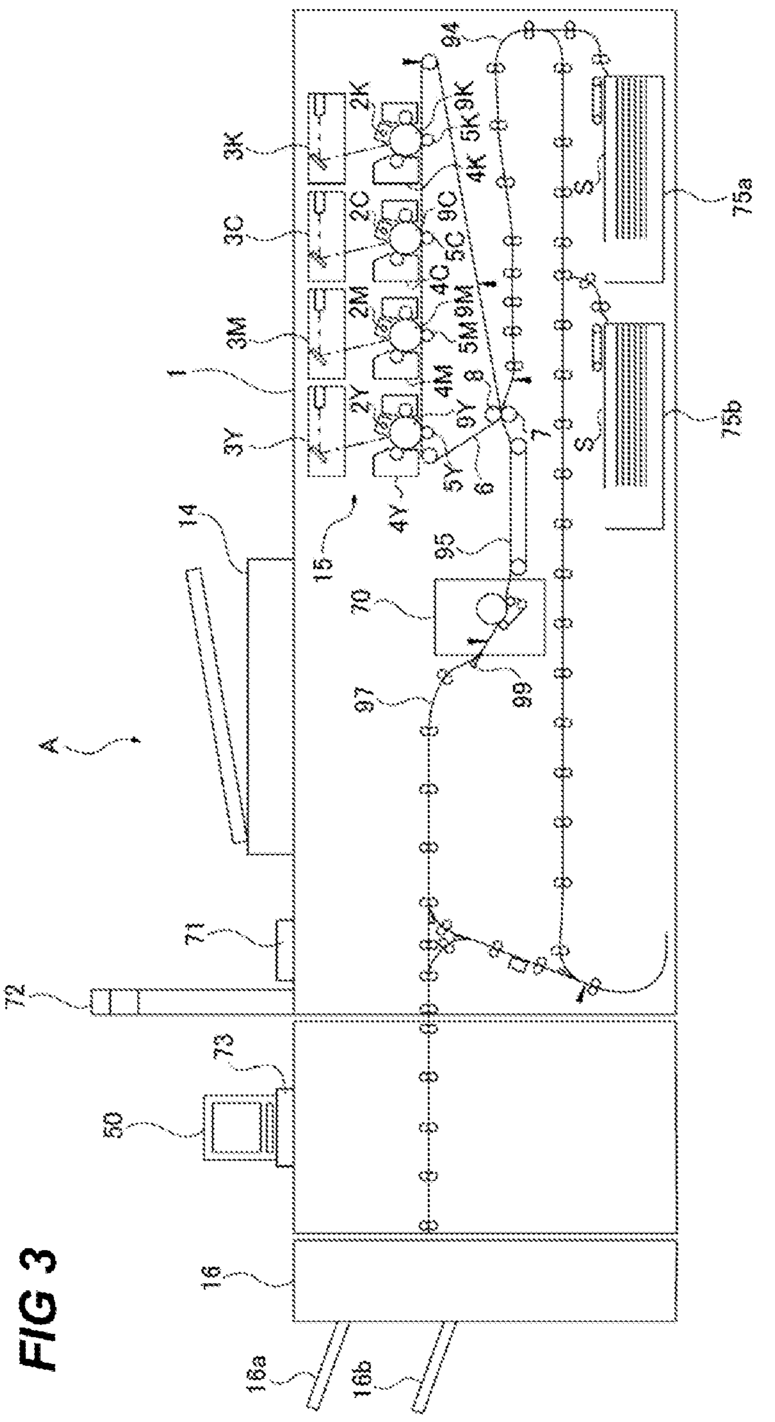
FIG. 3 is a schematic sectional view of the image forming system.

FIG. 3 is a schematic sectional view of the image forming system A. As illustrated in FIG. 3, the image forming apparatus 1 includes an image forming unit 15 which forms an image on a sheet S. The image forming unit 15 includes photoconductive drums 9Y, 9M, 9C, and 9K, charging devices 2Y, 2M, 2C, and 2K, and developing devices 4Y, 4M, 4C, and 4K. The image forming unit 15 further includes primary transfer rollers 5Y, 5M, 5C, and 5K, a laser scanner unit 3, an intermediate transfer belt 6, a secondary transfer roller 7, and a secondary transfer counter roller 8.

Figure 4:
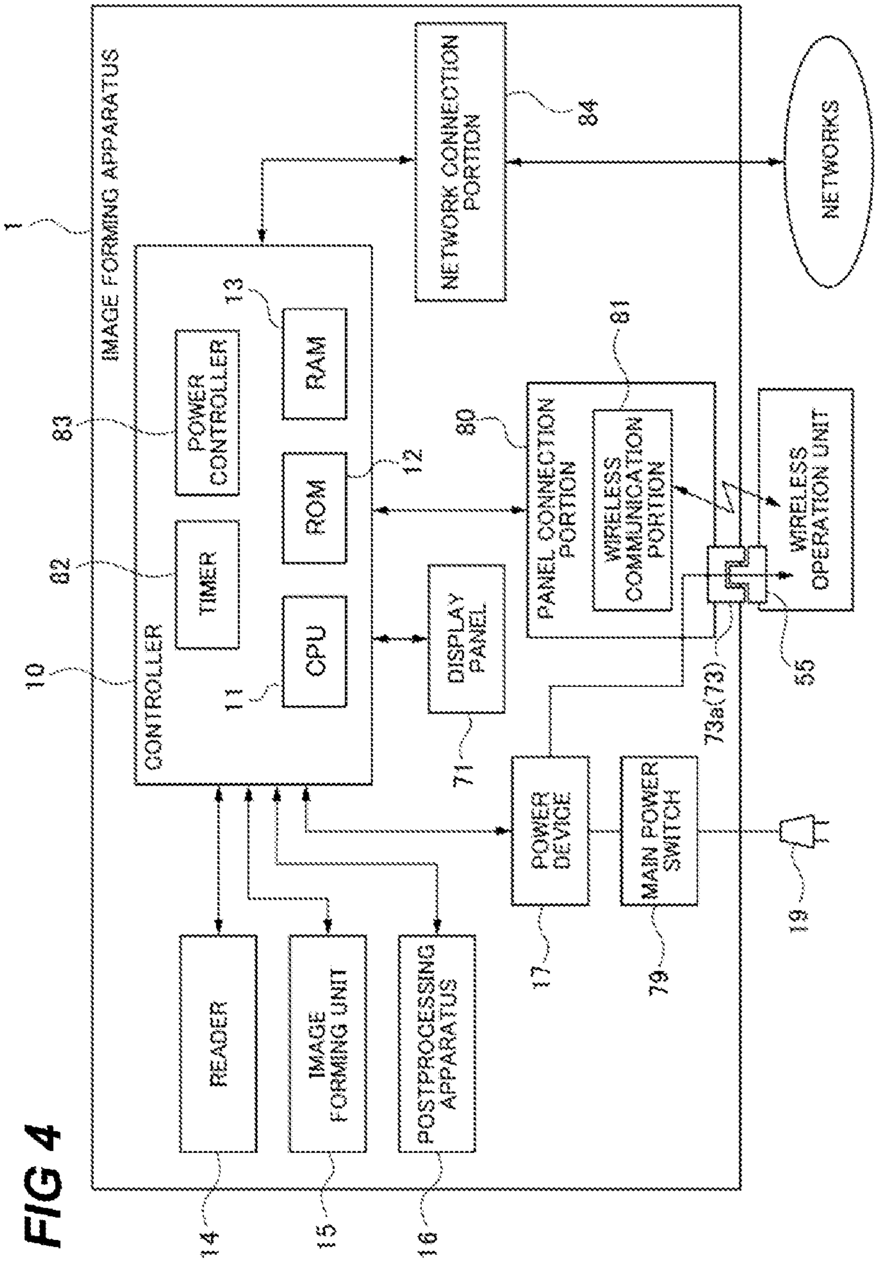
FIG. 4 is a block diagram of the system configuration of an image forming apparatus.

At the time of image forming of the image forming apparatus 1, an image-forming job signal is input to a controller 10 illustrated in FIG. 4. Thus, a sheet S housed in either a sheet cassette 75*a* or a sheet cassette 75*b* is sent to a conveyance path 94. After that, the sheet S is sent to a secondary transfer portion formed of the secondary transfer roller 7 and the secondary transfer counter roller 8 through the conveyance path 94.

Meanwhile, in the image forming unit 15, the charging device 2Y charges the surface of the photoconductive drum 9Y. After that, according to the image data of the original read by the reader 14 or image data transmitted from an external device not illustrated through a network, the laser scanner unit 3 irradiates the surface of the photoconductive drum 9Y with laser light, to form an electrostatic latent image on the surface of the photoconductive drum 9Y.

Next, the developing device 4Y causes yellow toner to adhere to the electrostatic latent image formed on the surface of the photoconductive drum 9Y, resulting in formation of a yellow toner image on the surface of the photoconductive drum 9Y. The toner image formed on the surface of the photoconductive drum 9Y is primary-transferred to the intermediate transfer belt 6 by application of a primary transfer bias to the primary transfer roller 5Y.

Due to similar processes, a magenta toner image, a cyan toner image, and a black toner image are formed on the photoconductive drums 9M, 9C, and 9K, respectively. Then, application of a primary transfer bias to each of the primary transfer rollers 5M, 5C, and 5K causes transfer such that the corresponding toner image is superimposed on the yellow toner image on the intermediate transfer belt 6. Thus, a full-color toner image corresponding to the image signal is formed on the surface of the intermediate transfer belt 6.

After that, the full-color toner image is sent to the secondary transfer portion by a circumferential run of the intermediate transfer belt 6. Then, the full-color toner image on the intermediate transfer belt 6 is transferred to the sheet S by application of a secondary transfer bias to the secondary transfer roller 7 at the secondary transfer portion. The sheet S having the toner image transferred thereto is conveyed to a fixing device 70 by a conveyance belt 95. Then, the fixing device 70 heats the sheet S under pressure, so that the toner image is fixed to the sheet S.

Next, the sheet S having the toner image fixed thereto is sent to the postprocessing apparatus 16 through a discharge path 97. In a case where postprocessing, such as stapling, punching, or binding, is designated by the user, the sheet S sent to the postprocessing apparatus 16 is subjected to the designated postprocessing, and then is discharged to a discharge tray 16*a*. In a case where no postprocessing is designated by the user, the sheet S sent to the postprocessing apparatus 16 is directly discharged to a discharge tray 16*b* without any postprocessing.

<System Configuration of Image Forming Apparatus>

Next, the system configuration of the image forming apparatus 1 will be described.

FIG. 4 is a block diagram of the system configuration of the image forming apparatus 1. As illustrated in FIG. 4, the image forming apparatus 1 includes the controller 10 (first controller) including a CPU 11, a ROM 12, a RAM 13, a timer 82, and a power controller 83. The controller 10 is in connection with the reader 14, the image forming unit 15, the postprocessing apparatus 16, the display panel 71, and a power device 17. The controller 10 is further in connection with a network connection portion 84 which establishes connection with an external device not illustrated, such as a personal computer, through a network.

Various types of programs regarding control of the image forming apparatus 1 and various types of image data are stored in the ROM 12. The CPU 11 performs various types of computing, based on a control program stored in the ROM 12. The RAM 13 temporarily stores data. That is, with the RAM 13 as a work area, based on the control program stored in the ROM 12, the CPU 11 controls, for example, the reader 14, the image forming unit 15, and the postprocessing apparatus 16 connected to the controller 10, to perform such an image forming operation as described above. Here, the CPU 11 may control all various types of units, such as the reader 14 and the image forming unit 15, or a plurality of CPUs may control one-to-one the various types of units.

The power device 17 connected to the controller 10 receives power from a commercial source of power through a power plug 19, performs conversion into power for use in each device, and supplies the power to each device. That is, when the main power switch 79 is switched from off to on, the power device 17 supplies power to the controller 10. After that, in response to an instruction from the CPU 11, the power controller 83 in the controller 10 switches a switch not illustrated between on and off, to control power supply from the power device 17 to each device in the image forming apparatus 1.

Specifically, in a normal case, the power controller 83 causes, in response to an instruction from the CPU 11, the power device 17 to supply power to the display panel 71, the network connection portion 84, a panel connection portion 80, the reader 14, and the image forming unit 15. Meanwhile, in a case where the image forming apparatus 1 remains unused for a certain time, the power controller 83 causes, in response to an instruction from the CPU 11, the power device 17 to stop supplying the power to the display panel 71, the reader 14, and the image forming unit 15, so that the image forming apparatus 1 transitions from the standby mode to the power-saving mode (sleep mode). From the count value of the timer 82, the CPU 11 determines the elapse of time until the start of transition to the power-saving mode. In a case where the image forming apparatus 1 transitions to the power-saving mode, the CPU 11 issues an instruction for transition to the power-saving mode, to a CPU 21 in the wireless operation unit 50 (FIG. 5).

The "instruction" herein corresponds to a predetermined signal. That is, in response to transition of the image forming apparatus 1 from the standby mode to the power-saving mode, the CPU 11 transmits a control signal to the CPU 21. Specifically, the CPU 11 controls a wireless communication portion 81 to transmit the control signal to a wireless communication portion 91. The control signal serves as a trigger which causes the wireless operation unit 50 to transition from the standby mode to the power-saving mode. As described in detail below, in the present embodiment, when the wireless communication portion 91 receives the control signal from the wireless communication portion 81, the CPU 21 turns off the lighting of the display 51 of the wireless operation unit 50.

Here, the standby mode and the power-saving mode as the operation mode of the image forming apparatus 1 will be described. The standby mode corresponds to a state where power is being supplied to the image forming unit 15. More specifically, the standby mode corresponds to a state ready to accept an execution signal as a trigger with which the CPU 11 causes the image forming unit 15 to perform image forming. That is, in the standby mode, when the wireless communication portion 81 (first communication portion) or the network connection portion 84 accepts the execution signal, the image forming unit 15 starts an image forming operation. For example, in response to a press on the button of "start copy" on the wireless operation unit 50, the execution signal is transmitted from the wireless communication portion 91 (second communication portion) in the wireless operation unit 50 to the wireless communication portion 81 in the image forming apparatus 1. Then, when determining that the wireless communication portion 81 has accepted the execution signal, the CPU 11 causes the image forming unit 15 to perform image forming.

Meanwhile, the power-saving mode corresponds to an exemplary state where the wireless communication portion 81 is not allowed to accept the execution signal. Provided are various levels of power-saving modes different in power consumption state. An exemplary "mode not allowing acceptance of the execution signal" included in the various levels of power-saving modes corresponds to the power-saving mode to be described below. That is, the following "power-saving mode" means the mode in which the wireless communication portion 81 is not allowed to accept the execution signal and the description thereof is omitted. The power-saving mode is less in power consumption than the standby mode described above.

For example, the time until the start of transition to the power-saving mode may be previously and unchangeably set to a predetermined time or may be settable to any time by the user. The predetermined time is measured by the timer (counter) 82 controlled by the controller 10. The timer 82 measures the time during which the image forming apparatus 1 receives no instruction for image forming from the user. As the target to be measured, the actual time may be measured or unique counting may be performed based on the actual time. For example, the count value for counting may increase like 1 second, 2 seconds, 3 seconds, and so on or may decrease like 60 seconds, 59 seconds, 58 seconds, and so on. In the present embodiment, an instruction for image forming to the image forming apparatus 1 corresponds to, for example, transmission of a signal for "start copy" to the image forming apparatus 1. When the wireless communication portion 81 receives the signal, for example, a photoconductive drum 9 starts to rotate. The timing at which the instruction for image forming terminates corresponds to the timing at which the image forming unit 15 terminates the image forming processing. Specifically, the timing corresponds to the timing at which the rotation of the photoconductive drum 9 stops. Note that the timing is not limited to the timing at which the rotation of the photoconductive drum 9 stops, and thus may correspond to, for example, the timing at which the rotation of the intermediate transfer belt 6 stops or the timing at which the sheet having the toner image transferred thereto is discharged to the discharge tray 16*a*.

Note that, in response to input of a type of signal, such as the image-forming job signal, to the controller 10 in the saving-power mode, the image forming apparatus 1 returns from the power-saving mode to the normal state. The timing at which the image forming apparatus 1 transitions to the power-saving mode is not limited to this. That is, for example, in response to an instruction for transition to the power-saving mode from the user with an external device connected through the network connection portion 84 or with the wireless operation unit 50, the image forming apparatus 1 may transition to the power-saving mode.

The controller 10 is in connection with the panel connection portion 80 which establishes connection with the wireless operation unit 50. The panel connection portion 80 includes the panel mount portion 73 having the feeding connector 73*a* to which the wireless operation unit 50 is connected and the wireless communication portion 81 (first communication portion) which performs wireless communication with the wireless operation unit 50. The charging connector 55 of the wireless operation unit 50 is connected to the feeding connector 73*a* of the panel mount portion 73. Mutual transmission and reception of an instruction or data is performed between the wireless communication portion 81 and the wireless communication portion 91 (exemplary second communication portion, FIG. 5) in the wireless operation unit 50.

Note that, between the image forming apparatus 1 and the wireless operation unit 50, wireless communication is performed based on Wi-Fi direct communication which is a communication form for inter-device direct connection. Miracast, which is a display transmission technique to which the scheme of the Wi-Fi direct communication is applied, is used, for example, in mobile phones, displays, and projectors. Note that wireless communication is not limited in scheme to the Wi-Fi direct communication. Thus, for example, wireless communication may be performed with a Wi-Fi router as an access point. Note that, from the viewpoint of security, the Wi-Fi direction communication is preferable. Instead of wireless communication based on Wi-Fi, wireless communication may be performed with a different scheme, such as Bluetooth or NFC.

<System Configuration of Wireless Operation Unit>

Next, the system configuration of the wireless operation unit 50 will be described.

FIG. 5 is a block diagram of the system configuration of the wireless operation unit 50. As illustrated in FIG. 5, the wireless operation unit 50 includes a controller 20 (second controller) including the CPU 21, a ROM 22 (storage portion), a RAM 23, a timer 24, a power controller 61, and an RTC 62.

In the ROM 22, stored are various types of data, such as images regarding the image forming apparatus 1, for example, a main menu screen that the display 51 displays, and programs regarding control of the wireless operation unit 50. The CPU 21 performs various types of computing, based on a control program stored in the ROM 22. The RAM 23 temporarily stores data.

That is, with the RAM 23 as a work area, based on the control program stored in the ROM 22, the CPU 21 controls, for example, the display 51, the speaker portion 53, the illumination portion 54, and a switch portion 64 connected to the controller 20. Specifically, based on the control program stored in the ROM 22 or an instruction received from the CPU 11 in the image forming apparatus 1, the CPU 21 performs control of displaying an image stored in the ROM 22 onto the display 51 or control of outputting sound from the speaker portion 53.

The timer 24 performs counting in time when the controller 20 performs various types of processing. The RTC 62 is a real-time clock having a primary battery as a power source, and always measures time, regardless of whether power to the wireless operation unit 50 is on or off. The power controller 61 always monitors the state of the power switch 52, and switches on or off a power FET 65 in the switch portion 64, in response to an operation of switching the power switch 52 between on and off. Note that the power controller 61 and the CPU 21 may be achieved by different processors or may be achieved by the same processor.

The wireless operation unit 50 includes a connection portion 90 which establishes connection with the image forming apparatus 1. The connection portion 90 includes the charging connector 55 to be connected to the feeding connector 73*a* in the image forming apparatus 1 and the wireless communication portion 91 which performs wireless communication with the image forming apparatus 1. Mutual transmission and reception of an instruction or data is performed between the wireless communication portion 91 and the wireless communication portion 81 in the image forming apparatus 1.

The wireless operation unit 50 further includes a panel power portion 56. The panel power portion 56 includes the battery 57, a power generation portion 58, and a remaining-level monitoring portion 63 (detection portion). The battery 57 is rechargeable and serves as the main source of the wireless operation unit 50. In response to connection of the charging connector 55 to the feeding connector 73*a* in the image forming apparatus 1, power is supplied from the power device 17 in the image forming apparatus 1 to the battery 57, so that the battery 57 is charged. The remaining level of the battery 57 is detected by the remaining-level monitoring portion 63. The power generation portion 58 adjusts power from the battery 57 to voltage available to each electronic component described above in the wireless operation unit 50.

Figure 6:
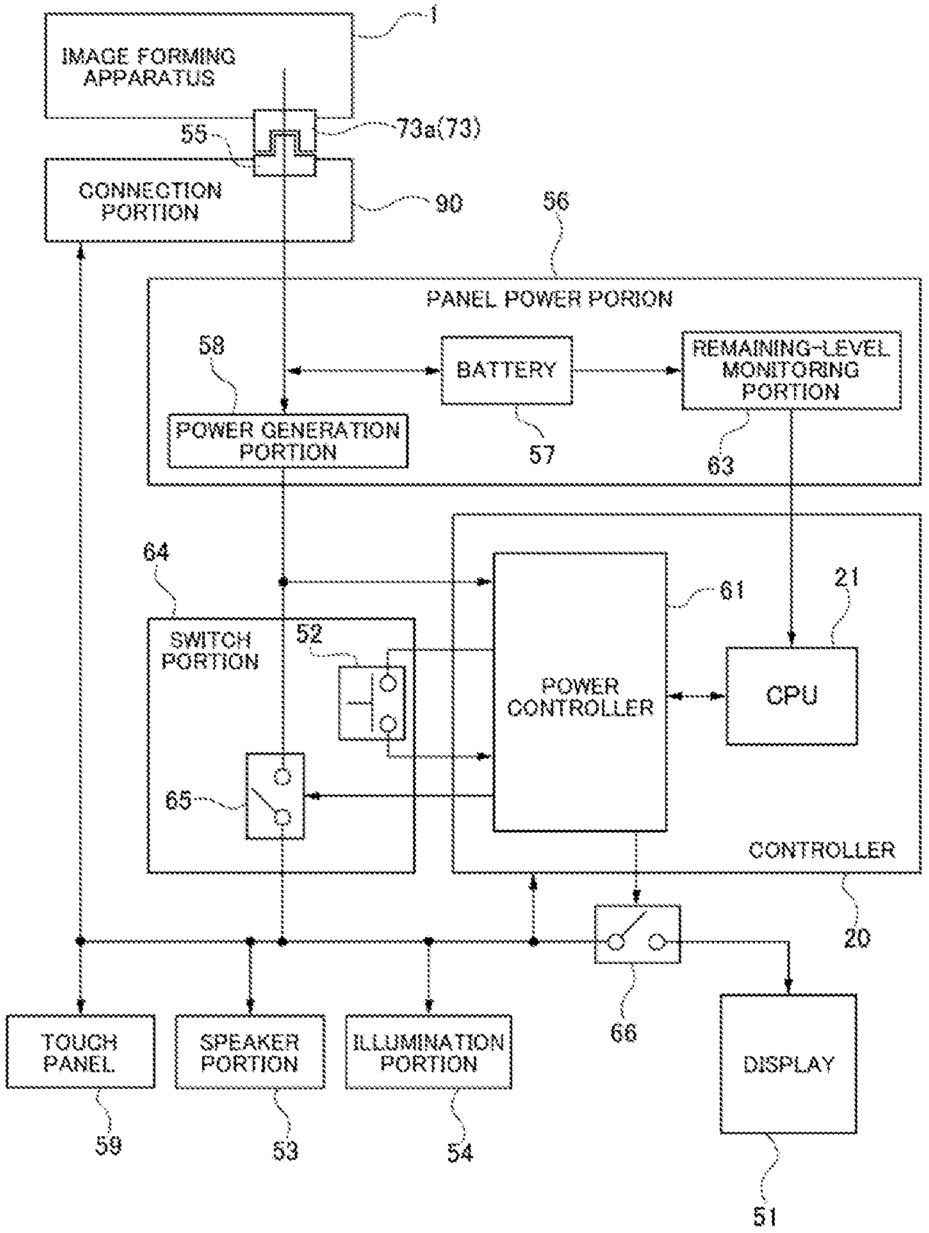
FIG. 6 is a block diagram of the power system of the wireless operation unit.

FIG. 6 is a block diagram of the power system of the wireless operation unit 50. As illustrated in FIG. 6, the output power of the battery 57 in the wireless operation unit 50 is supplied to the power generation portion 58. The power generation portion 58 adjusts the power to voltage for use in each electronic component in the wireless operation unit 50 and then outputs the voltage. In a case where the charging connector 55 of the wireless operation unit 50 is connected to the feeding connector 73*a* of the image forming apparatus 1, the battery 57 is charged by the image forming apparatus 1. In addition, the power generation portion 58 is supplied with power from the image forming apparatus 1 serving as a main power source.

The voltage output from the power generation portion 58 is supplied to each of the power FET 65 and the power controller 61. That is, the power controller 61 is always supplied with power. The power controller 61 monitors the output of the power FET 65, and switches the power FET 65 between on and off, in response to an operation of switching the power switch 52.

In a case where the power FET 65 is on, the voltage adjusted and output by the power generation portion 58 is supplied to the connection portion 90, the display 51, the speaker portion 53, and the illumination portion 54 in the wireless operation unit 50. Note that a switch 66 is provided on the power supply line to the display 51. The CPU 21 controls the switch 66 between on and off through the power controller 61, to control power supply to the display 51. The remaining-level monitoring portion 63 detects the remaining level of the battery 57, based on the output voltage of the battery 57. In a case where the remaining level of the battery 57 is a predetermined level or less, the remaining-level monitoring portion 63 notifies the CPU 21 that the remaining level of the battery 57 is the predetermined level or less.

<Power-Saving-Mode Transition Sequence>

In the wireless operation unit 50, the power consumption of lighting of the display 51 accounts for approximately 90% of the entire power consumption. Thus, in a predetermined case where the lighting of the display 51 is not necessarily required, the CPU 21 stops the power supply to the display 51, to cause the wireless operation unit 50 to transition to the power-saving mode, so that the battery 57 is inhibited from consuming. Here, the power controller 61 can control the supply amount of power from the battery 57 to the display 51, the speaker portion 53, or the illumination portion 54. That is, the power controller 61 controls the supply amount of power from the battery 57 to the display 51, so that the brightness of the display 51 can be adjusted. Furthermore, the power controller 61 brings, to zero, the supply amount of power from the battery 57 to the display 51, so that the lighting of the display 51 can be turned off. A power-saving-mode transition sequence which is control when the CPU 21 causes the wireless operation unit 50 to transition to the power-saving mode will be described below with a flowchart illustrated in FIG. 7.

Figure 7:
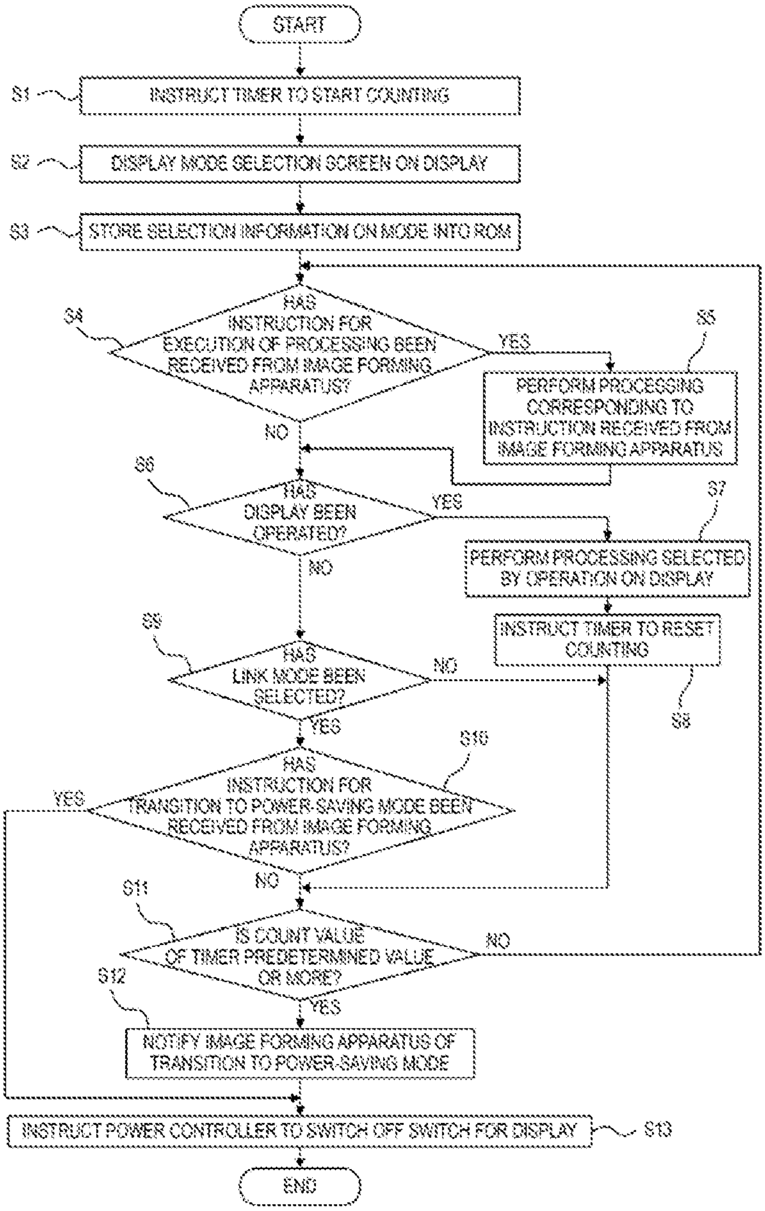
FIG. 7 is a flowchart of a power-saving-mode transition sequence.

As illustrated in FIG. 7, when the wireless operation unit 50 boots up due to switching of the power switch 52 from off to on, the CPU 21 instructs the timer 24 to start counting (S1). Thus, the timer 24 starts counting in time. Note that, at the timing at which the wireless operation unit 50 is detached from the panel mount portion 73 in the image forming apparatus 1, the CPU 21 may instruct the timer 24 to start counting.

Figure 8:
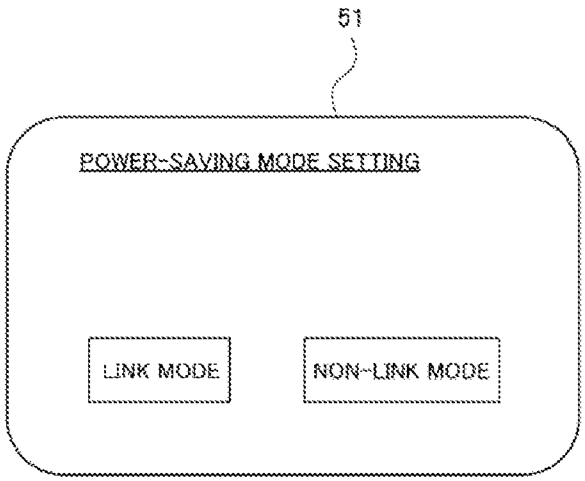
FIG. 8 illustrates a mode selection screen displayed on a display.

Next, the CPU 21 causes the display 51 to display a mode selection screen illustrated in FIG. 8 (S2). Note that image data of the mode selection screen is previously stored in the ROM 22. As illustrated in FIG. 8, the mode selection screen enables selection of the link mode (one mode or first mode) in which transition of the image forming apparatus 1 to the power-saving mode and transition of the wireless operation unit 50 to the power-saving mode are linked together or selection of the non-link mode (other mode or second mode) in which no link is allowed in transition to the power-saving mode. The mode selection screen can be activated at any timing by the user. When the user operates the display 51 to select a mode, the CPU 21 receives selection information on the mode from a touch panel 59 and then stores the selection information into the ROM 22 (S3).

Next, in a case where an instruction for execution of processing is received from the CPU 11 in the image forming apparatus 1, the CPU 21 performs the processing corresponding to the received instruction (S4, S5). For example, in a case where an instruction for error screen display is received from the CPU 11 in the image forming apparatus 1, the CPU 21 causes the display 51 to display an error screen stored in the ROM 22. Note that the instruction for execution of processing herein includes no instruction for transition to the power-saving mode.

Next, from information input from the touch panel 59, the CPU 21 determines whether or not the display 51 has been operated (S6). When determining that the display 51 has been operated, the CPU 21 performs the processing selected by the operation (S7). For example, in a case where an image-forming job execution button is selected on the display screen of the display 51, the CPU 21 notifies the image forming apparatus 1 that the image-forming job execution button has been selected. In a case where a setting button is selected on the display screen of the display 51, the CPU 21 causes the display 51 to display a setting screen for settings regarding image forming. After performing the processing, the CPU 21 instructs the timer 24 to reset the counting (S8). Thus, the timer 24 resets the count value and then starts counting again.

Next, the CPU 21 determines whether or not the count value of the timer 24 is a predetermined value or more (S11). The threshold for the count value may be previously stored as a fixed value in the ROM 22 or may be settable on the display 51 by the user. When determining that the count value of the timer 24 is not the predetermined value or more, the CPU 21 goes back to step S4 and then repeats the steps described above.

Meanwhile, when determining that the count value of the timer 24 is the predetermined value or more, the CPU 21 notifies the CPU 11 in the image forming apparatus 1 that the wireless operation unit 50 transitions to the power-saving mode (S12). After that, the CPU 21 instructs the power controller 61 to switch off the switch 66 for the display 51 (S13). Thus, the power to the display 51 is turned off and the lighting of the display 51 is turned off, so that the wireless operation unit 50 transitions to the power-saving mode. That is, when the time during which the wireless operation unit 50 remains unoperated exceeds a predetermined time (first predetermined time), the CPU 21 causes the power controller 61 to switch off the switch 66 for the display 51.

As above, the wireless operation unit 50 transitions to the power-saving mode, in response to a control signal transmitted from the image forming apparatus 1 side. In the example, stopping the power supply from the battery 57 to the display 51 causes the lighting of the display 51 to be turned off. However, a reduction may be made in the supply amount of power from the battery 57 to the display 51. For example, when the image forming apparatus 1 is in the standby mode, a predetermined amount of power is supplied from the battery 57 to the display 51. Then, in response to transition of the image forming apparatus 1 from the standby mode to the power-saving mode, the power controller 61 may make the supply amount of power from the battery 57 to the display 51 less than the predetermined amount, in order to inhibit the power consumption of the wireless operation unit 50. As above, making the supply amount of power from the battery 57 to the display 51 less than the predetermined amount includes not only making a reduction in the supply amount of power but also bringing the supply amount of power to zero (stopping the power supply).

When determining at step S6 that the display 51 has not been operated, the CPU 21 determines whether or not the link mode has been selected, from the information stored in the ROM 22 at step S3 (S9). Next, when determining that the link mode has not been selected, the CPU 21 proceeds to step S11.

Meanwhile, when determining that the link mode has been selected, the CPU 21 determines whether or not an instruction for transition to the power-saving mode has been received from the CPU 11 in the image forming apparatus 1 (S10). When determining that an instruction for transition to the power-saving mode has not been received from the CPU 11 in the image forming apparatus 1, the CPU 21 proceeds to step S11. When determining that an instruction for transition to the power-saving mode has been received from the CPU 11 in the image forming apparatus 1, the CPU 21 instructs the power controller 61 to switch off the switch 66 for the display 51, so that the wireless operation unit 50 transitions to the power-saving mode (S13). Specifically, the CPU 11 controls the wireless communication portion 81 to transmit a control signal to the wireless communication portion 91. The control signal serves as a signal for control of the power controller 61. That is, when the wireless communication portion 91 receives the control signal, the CPU 21 instructs the power controller 61 to switch off the switch 66 for the display 51. Note that the timing at which the CPU 21 instructs, in response to an instruction for transition to the power-saving mode, the power controller 61 to switch off the switch 66 for the display 51 may be several seconds after reception of the instruction for transition to the power-saving mode (after elapse of a second predetermined time), instead of immediately after reception of the instruction for transition to the power-saving mode. Usually, if the wireless operation unit 50 is not operated, the CPU 21 instructs, in response to elapse of the first predetermined time, the power controller 61 to switch off the switch 66 for the display 51. Meanwhile, in the present arrangement, in response to elapse of the second predetermined time shorter than the first predetermined time after the wireless communication portion 91 receives the control signal, the CPU 21 instructs the power controller 61 to switch off the switch 66 for the display 51. This arrangement enables the wireless operation unit 50 to be brought into a power-saving state as promptly as possible, in response to transition of the image forming apparatus 1 from the standby mode to the power-saving mode.

The power-saving mode for the image forming apparatus 1 includes various types of modes, and one of the modes causes the power supply from the power device 17 to the wireless communication portion 81 to stop. That is, in some cases, in response to transition of the image forming apparatus 1 from the standby mode to the power-saving mode, the connection of wireless communication between the image forming apparatus 1 and the wireless operation unit 50 is shut down. In this case, in response to the shutdown of wireless communication, the CPU 21 instructs the power controller 61 to switch off the switch 66 for the display 51.

As above, according to the present embodiment, in a case where the link mode is selected by the user, the wireless operation unit 50 transitions to the power-saving mode along with transition of the image forming apparatus 1 to the power-saving mode. Even in a case where the image forming apparatus 1 does not transition to the power-saving mode, the wireless operation unit 50 transitions to the power-saving mode when a predetermined time elapses without any operation on the display 51 of the wireless operation unit 50. Such an arrangement inhibits power consumption due to the display 51, so that the power consumption of the wireless operation unit 50 can be inhibited.

Second Embodiment

Next, an image forming apparatus according to a second embodiment of the present invention will be described with the drawings. Parts the same as those in the first embodiment are denoted with the same reference signs with reference to the same drawings, and thus the descriptions thereof will be omitted.

In the present embodiment, described will be a power-saving-mode transition sequence that a CPU 21 performs, in which a wireless operation unit 50 transitions to the power-saving mode according to the remaining level of a battery 57. Note that the image forming apparatus 1 and the wireless operation unit 50 in the present embodiment are similar in hardware configuration to those in the first embodiment.

The power-saving-mode transition sequence according to the present embodiment will be described below with flowcharts illustrated in FIGS. 9 and 10. Note that, in the following description, steps similar in processing to those described in the first embodiment with FIGS. 7 and 8 are denoted with the same reference signs and the descriptions thereof will be omitted or simplified.

Figure 9:
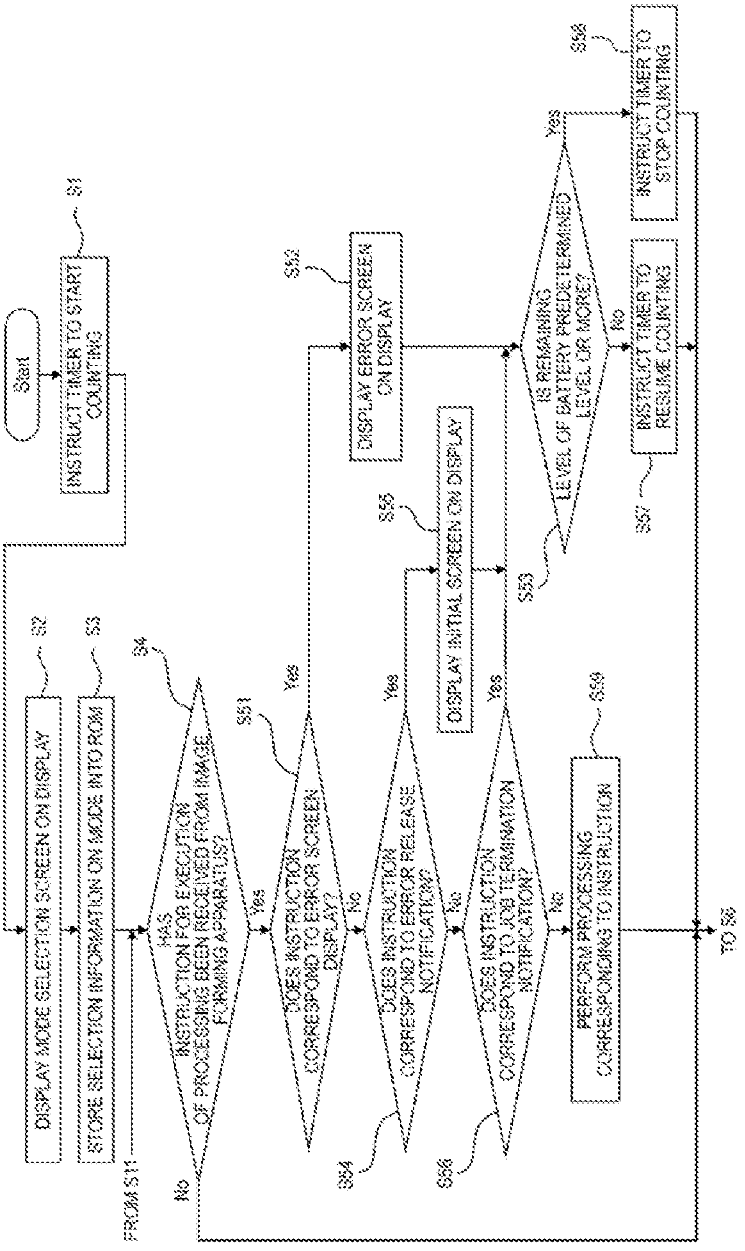
FIG. 9 is a flowchart of a power-saving-mode transition sequence.
Figure 10:
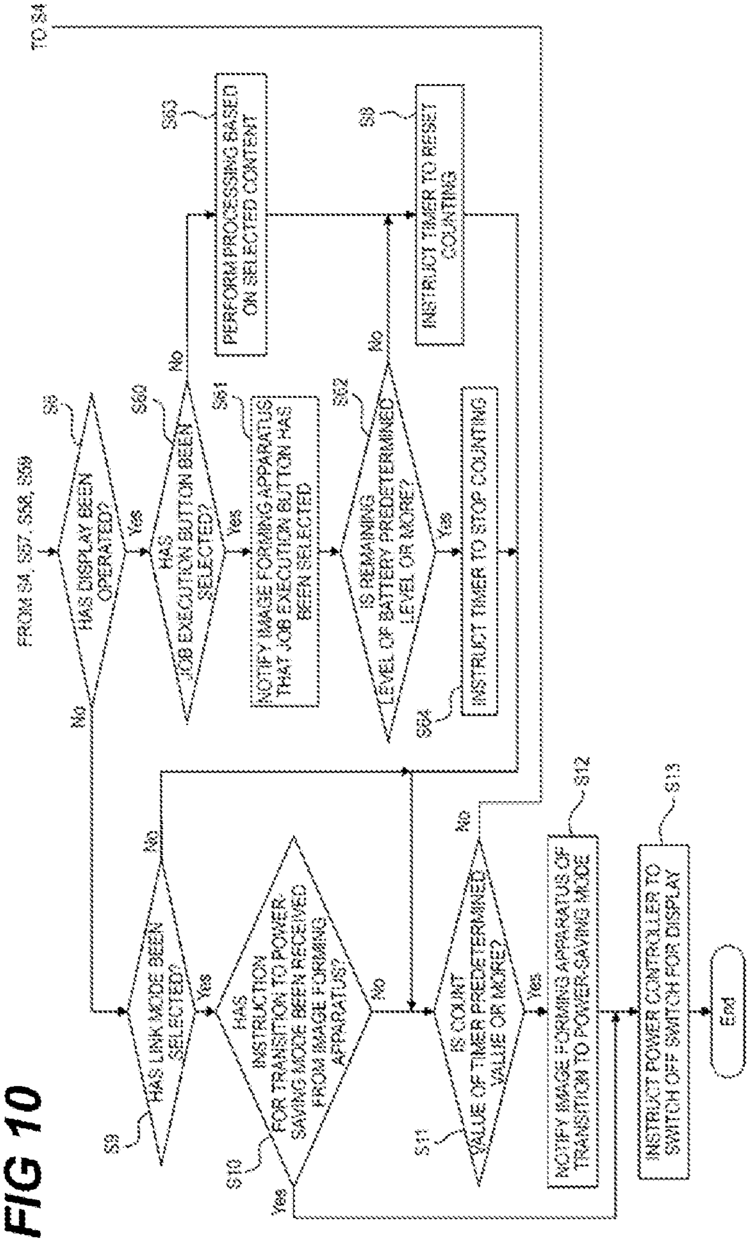
FIG. 10 is a flowchart of the power-saving-mode transition sequence.

As illustrated in FIGS. 9 and 10, when the wireless operation unit 50 boots up due to switching of a power switch 52 from off to on, the CPU 21 instructs a timer 24 to start counting (S1). Thus, the timer 24 starts counting in time. Next, the CPU 21 causes a display 51 to display a mode selection screen illustrated in FIG. 8 (S2). After that, when the user operates the display 51 to select either the link mode or the non-link mode, the CPU 21 receives selection information on the corresponding mode from a touch panel 59 and then stores the selection information into a ROM 22 (S3).

Next, in a case where an instruction for execution of processing is received from a CPU 11 in the image forming apparatus 1, the CPU 21 determines to which one the instruction corresponds, error screen display, error release notification, or job termination notification (S4, S51, S54, S56). Here, in a case where the instruction received from the CPU 11 in the image forming apparatus 1 does not correspond to any thereof, the CPU 21 performs processing corresponding to the instruction (S59). Note that the instruction not corresponding to any thereof herein includes no instruction for transition to the power-saving mode.

Meanwhile, in a case where the instruction received from the CPU 11 in the image forming apparatus 1 corresponds to the error screen display, the CPU 21 causes the display 51 to display an error screen stored in the ROM 22 (S52). In a case where the error release notification is received from the CPU 11 in the image forming apparatus 1, the CPU 21 causes the display 51 to display an initial screen after error release stored in the ROM 22 (S55). After that, based on information received from a remaining-level monitoring portion 63, the CPU 21 determines whether or not the remaining level of the battery 57 is a predetermined level or more (S53). The CPU 21 also performs similar processing after reception of the job termination notification from the CPU 11 in the image forming apparatus 1 (S53).

Here, when determining that the remaining level of the battery 57 is the predetermined level or more, the CPU 21 instructs the timer 24 to stop counting (S58). Thus, the timer 24 stops counting. Meanwhile, when determining that the remaining level of the battery 57 is less than the predetermined level, the CPU 21 instructs the timer 24 to resume counting (S57). Thus, the timer 24 resumes the counting remaining stopped. Note that, in a case where the timer 24 remains counting, the timer 24 further continues counting.

Next, from information input from the touch panel 59, the CPU 21 determines whether or not the display 51 has been operated (S6). When determining that the display 51 has been operated, from the information input from the touch panel 59, the CPU 21 determines whether or not a job execution button has been selected (S60). When determining that the job execution button has not been selected, the CPU 21 performs the processing based on the selected content, and instructs the timer 24 to reset the counting (S63, S8). Thus, the timer 24 resets the count value and then starts counting again.

Meanwhile, when determining that the job execution button has been selected, from the information input from the touch panel 59, the CPU 21 notifies the CPU 11 in the image forming apparatus 1 that the job execution button has been selected (S61). Next, based on information received from the remaining-level monitoring portion 63, the CPU 21 determines whether or not the remaining level of the battery 57 is the predetermined level or more (S62). After that, when determining that the remaining level of the battery 57 is the predetermined level or more, the CPU 21 instructs the timer 24 to stop counting (S64). When determining that the remaining level of the battery 57 is less than the predetermined level, the CPU 21 instructs the timer 24 to reset the counting (S8).

Next, the CPU 21 determines whether or not the count value of the timer 24 is a predetermined value or more (S11). When determining that the count value of the timer 24 is not the predetermined value or more, the CPU 21 goes back to step S4 and then repeats the steps described above. Meanwhile, when determining that the count value of the timer 24 is the predetermined value or more, the CPU 21 notifies the CPU 11 in the image forming apparatus 1 that the wireless operation unit 50 transitions to the power-saving mode (S12). After that, the CPU 21 instructs a power controller 61 to switch off a switch 66 for the display 51 (S13). Thus, the power to the display 51 is turned off and the lighting of the display 51 is turned off, so that the wireless operation unit 50 transitions to the power-saving mode.

When determining at step S6 that the display 51 has not been operated, the CPU 21 determines whether or not the link mode has been selected, from the information stored in the ROM 22 at step S3 (S9). Next, when determining that the link mode has not been selected, the CPU 21 proceeds to step S11.

Meanwhile, when determining that the link mode has been selected, the CPU 21 determines whether or not an instruction for transition to the power-saving mode has been received from the CPU 11 in the image forming apparatus 1 (S10). When determining that an instruction for transition to the power-saving mode has not been received from the CPU 11 in the image forming apparatus 1, the CPU 21 proceeds to step S11. When determining that an instruction for transition to the power-saving mode has been received from the CPU 11 in the image forming apparatus 1, the CPU 21 instructs the power controller 61 to switch off the switch 66 for the display 51, so that the wireless operation unit 50 transitions to the power-saving mode (S13).

As above, according to the present embodiment, in a case where the link mode is selected by the user, the wireless operation unit 50 transitions to the power-saving mode along with transition of the image forming apparatus 1 to the power-saving mode. Even in a case where the image forming apparatus 1 does not transition to the power-saving mode, the wireless operation unit 50 transitions to the power-saving mode when a predetermined time elapses without any operation on the display 51 of the wireless operation unit 50 and the remaining level of the battery 57 is less than the predetermined level. Such an arrangement inhibits power consumption due to the display 51, so that the power consumption of the wireless operation unit 50 can be inhibited.

In a case where a predetermined instruction is received from the image forming apparatus 1 or in a case where a predetermined operation is made through the display 51, the CPU 21 causes, when the remaining level of the battery 57 is the predetermined level or more, the timer 24 to stop. Such an arrangement causes the CPU 21 to stop the power supply from the battery 57 to the display 51, in a case where the remaining level of the battery 57 is less than the predetermined level when the image forming apparatus 1 transitions from the standby mode to the power-saving mode. Meanwhile, in a case where the remaining level of the battery 57 is the predetermined level or more when the image forming apparatus 1 transitions from the standby mode to the power-saving mode, the power supply from the battery 57 to the display 51 continues. Even in a case where the predetermined time elapses without any operation on the wireless operation unit 50, the wireless operation unit 50 does not transition to the power-saving mode when the remaining level of the battery 57 is sufficient. Therefore, at the time of an operation to the wireless operation unit 50, the user does not need to wait for recovery time from the power-saving mode, so that an improvement can be made in the operability to the user.

Third Embodiment

Next, an image forming apparatus according to a third embodiment of the present invention will be described with the drawings. Parts the same as those in the first embodiment and the second embodiment are denoted with the same reference signs with reference to the same drawings, and thus the descriptions thereof will be omitted.

Regarding an image forming apparatus 1 installed in an office or store, the period of time a user uses the image forming apparatus 1 is generally defined according to the business hours of the office or the opening hours of the store. For the period of time the user uses the image forming apparatus 1, from the viewpoint of operability, preferably, there is no recovery time from the power-saving mode when the user operates a wireless operation unit 50.

Therefore, in the present embodiment, described will be a power-saving-mode transition sequence that a CPU 21 performs, in which a wireless operation unit 50 transitions to the power-saving mode according to the time indicated by an RTC 62. Note that the image forming apparatus 1 and the wireless operation unit 50 in the present embodiment are similar in hardware configuration to those in the first embodiment.

Figure 11:
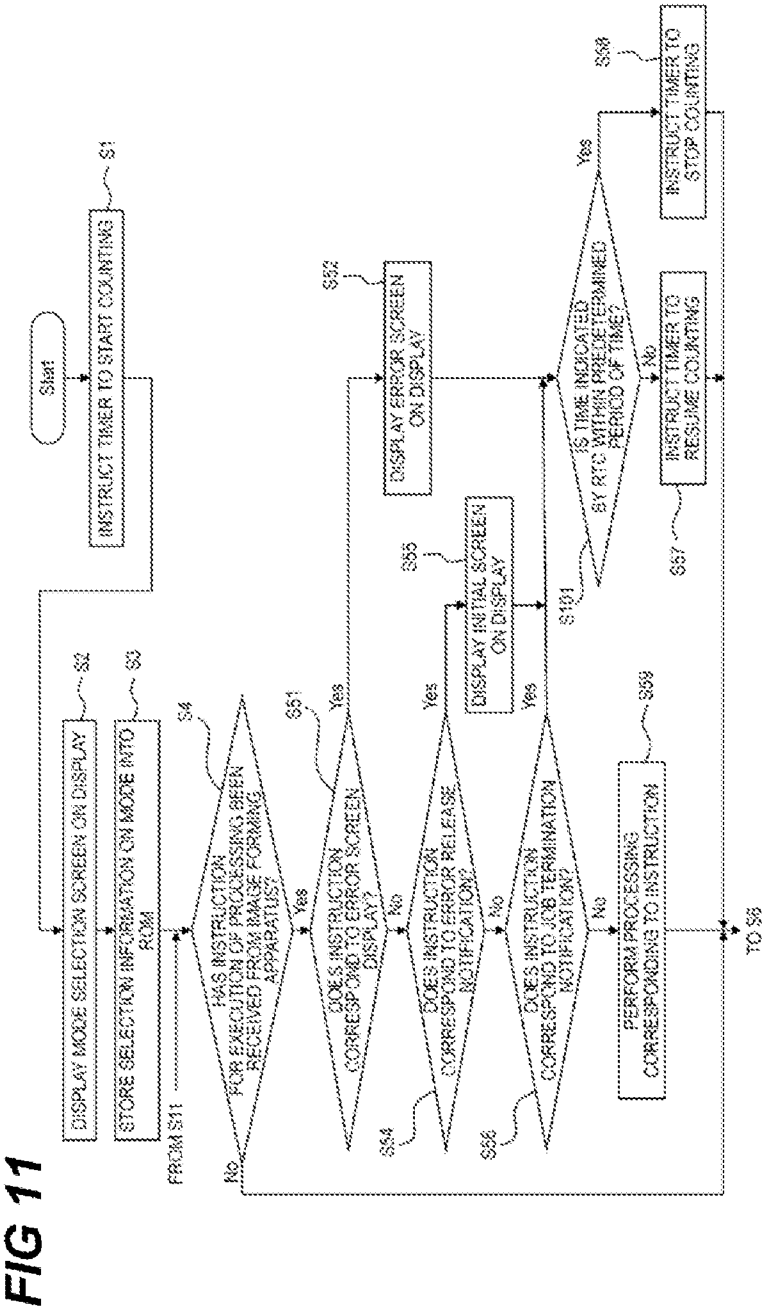
FIG. 11 is a flowchart of a power-saving-mode transition sequence.
Figure 12:
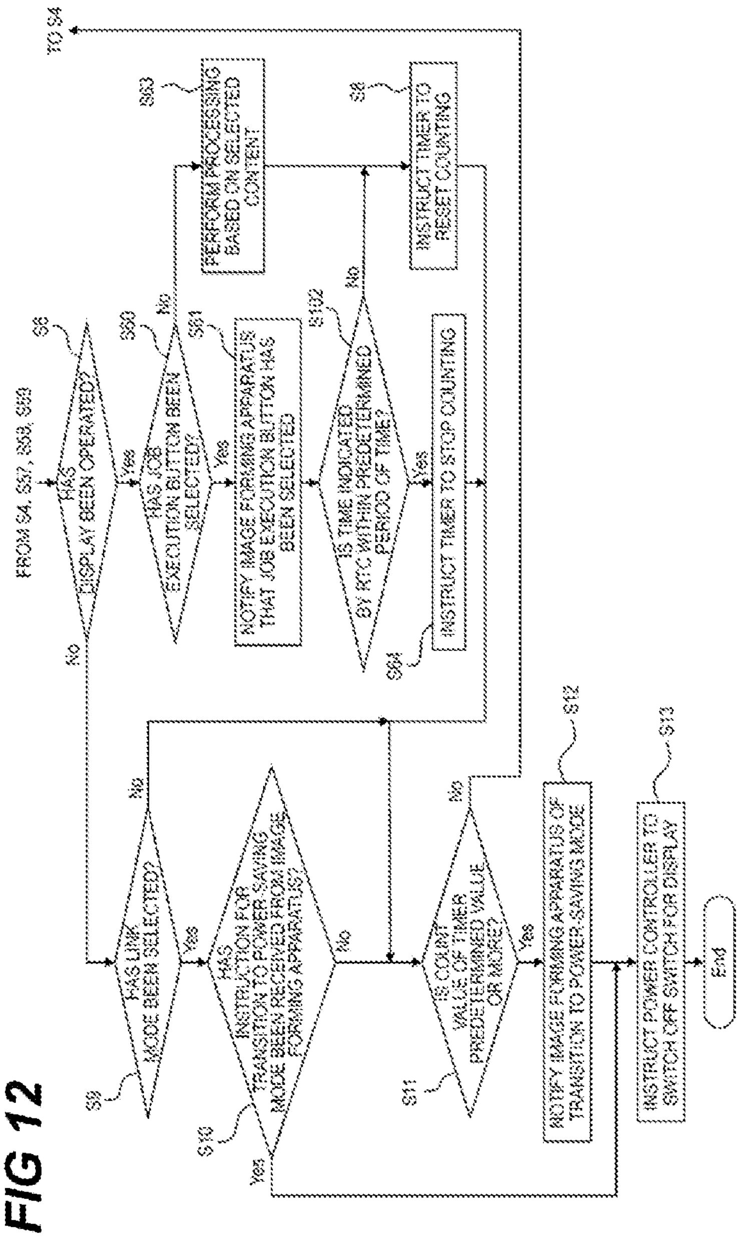
FIG. 12 is a flowchart of the power-saving-mode transition sequence.

The power-saving-mode transition sequence according to the present embodiment will be described below with flowcharts illustrated in FIGS. 11 and 12. As illustrated in FIGS. 11 and 12, the power-saving-mode transition sequence according to the present embodiment is different from the power-saving-mode transition sequence according to the second embodiment illustrated in FIGS. 9 and 10 in terms of steps corresponding to steps S53 and S62. Therefore, in the following, steps similar in processing to those described with FIGS. 9 and 10 in the second embodiment are denoted with the same reference signs and the descriptions thereof will be omitted, and only steps different in processing will be described.

As illustrated in FIGS. 11 and 12, based on information input from the RTC 62 after a display 51 displays an error screen or an initial screen in response to an instruction from a CPU 11 in the image forming apparatus 1, the CPU 21 determines whether or not the time indicated by the RTC 62 is within a predetermined period of time (S101). The CPU 21 also performs similar processing after reception of job termination notification from the CPU 11 in the image forming apparatus 1 (S101).

Here, when determining that the time indicated by the RTC 62 is within the predetermined period of time, the CPU 21 instructs a timer 24 to stop counting (S58). The predetermined period of time is set by an operation from the user onto the display 51 or an external device connected through a network. Thus, the timer 24 stops counting. Meanwhile, when determining that the time indicated by the RTC 62 is not within the predetermined period of time, the CPU 21 instructs the timer 24 to resume counting (S57). Thus, the timer 24 resumes the counting remaining stopped. Note that, in a case where the timer 24 remains counting, the timer 24 further continues counting.

When determining that a job execution button has been selected, from information input from a touch panel 59, the CPU 21 notifies the CPU 11 in the image forming apparatus 1 that the job execution button has been selected. Then, based on information input from the RTC 62, the CPU 21 determines whether or not the time indicated by the RTC 62 is within the predetermined period of time (S61, S102). After that, when determining that the time indicated by the RTC 62 is within the predetermined period of time, the CPU 21 instructs the timer 24 to stop counting (S64). When determining that the time indicated by the RTC 62 is not within the predetermined period of time, the CPU 21 instructs the timer 24 to reset the counting (S8).

As above, according to the present embodiment, in a case where the link mode is selected by the user, the wireless operation unit 50 transitions to the power-saving mode along with transition of the image forming apparatus 1 to the power-saving mode, similarly to the first embodiment and the second embodiment. Even in a case where the image forming apparatus 1 does not transition to the power-saving mode, the wireless operation unit 50 transitions to the power-saving mode when a predetermined time elapses without any operation on the display 51 of the wireless operation unit 50 and the time indicated by the RTC 62 is not within the predetermined period of time. Such an arrangement inhibits power consumption due to the display 51, so that the power consumption of the wireless operation unit 50 can be inhibited.

In a case where a predetermined instruction is received from the image forming apparatus 1 or in a case where a predetermined operation is made through the display 51, the CPU 21 causes, when the time indicated by the RTC 62 is within the predetermined period of time, the timer 24 to stop. Due to such an arrangement, even in a case where the predetermined time elapses without any operation on the wireless operation unit 50, the wireless operation unit 50 does not transition to the power-saving mode when the time indicated by the RTC 62 is within the predetermined period of time. For example, in a case where the business hours of an office or the opening hours of a store are set as the predetermined period of time, the wireless operation unit 50 does not transition to the power-saving mode even in a case where the predetermined time elapses without any operation on the wireless operation unit 50 in the period of time. Therefore, at the time of an operation to the wireless operation unit 50, the user does not need to wait for recovery time from the power-saving mode, so that an improvement can be made in the operability to the user.

Note that, in each of the first to third embodiments, given has been the configuration in which the wireless operation unit 50 is detachably attachable to the panel mount portion 73 in the image forming apparatus 1 and the battery 57 is charged in response to mounting of the wireless operation unit 50 on the panel mount portion 73. However, the present invention is not limited to this. That is, the wireless operation unit 50 is not necessarily attachable to the image forming apparatus 1. The battery 57 in the wireless operation unit 50 may be charged by a charger plugged in a receptacle for a commercial source of power.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2020-164538, filed Sep. 30, 2020, which is hereby incorporated by reference herein in its entirety.

What is claimed is:

1. An image forming system comprising:

an image forming apparatus including an image forming unit configured to form an image on a sheet, the image forming apparatus being capable of transitioning between a standby mode which is a power state enabling image forming to be performed and a sleep mode which is a power state less in power consumption than the standby mode;

a first communication portion provided in the image forming apparatus; and a wireless operation device configured to accept an operation from a user, the wireless operation device including:

a display configured to display information;

a battery configured to supply a power to the display such that the display lights up;

a controller configured to control supplying the power from the battery to the display; and a second communication portion enabling wireless communication with the first communication portion, wherein, the first communication portion transmits a control signal to the second communication portion, in a case where the image forming apparatus transitions from the standby mode to the sleep mode, and wherein, the controller saves an amount of power to be supplied from the battery to the display based on receiving the control signal.

2. The image forming system according to claim 1, wherein the controller saves the amount of power to be supplied from the battery to the display in a case where the wireless operation device remains unoperated continues for more than a first time in a state where the image forming apparatus is in the standby mode, and saves the amount of power to be supplied from the battery to the display in a case where the wireless operation device remains unoperated continues for more than a second time shorter than the first time after the image forming apparatus transitions from the standby mode to the sleep mode.

3. The image forming system according to claim 1, wherein when the image forming apparatus transitions from the standby mode to the sleep mode, the controller stops supplying the power-from the battery to the display.

4. The image forming system according to claim 1, wherein the wireless operation device includes a first mode and a second mode, the controller saves the amount of power to be supplied from the battery to the display in response to the transition of the image forming apparatus from the standby mode to the sleep mode in a case where the amount of power is supplied from the battery to the display in the first mode, and the controller does not save the amount of power to be supplied from the battery to the display even if the image forming apparatus transitions from the standby mode to the sleep mode in the second mode.

5. The image forming system according to claim 1, wherein the wireless operation device includes a detection portion configured to detect a remaining level of the battery, and wherein in a case where the remaining level of the battery is less than a predetermined level and the image forming apparatus transitions from the standby mode to the sleep mode, the controller makes the supply amount of power from the battery to the display less than the predetermined amount, and wherein, in a case where the remaining level of the battery is the predetermined level or more and the image forming apparatus transitions from the standby mode to the sleep mode, the controller keeps the predetermined amount of power being supplied from the battery to the display.

6. The image forming system according to claim 1, wherein the image forming apparatus includes a mount portion on which the wireless operation device is mountable, and wherein the battery is charged in a state where the wireless operation device is mounted on the mount portion.

7. The image forming system according to claim 1, wherein the display is a touch panel configured to accept a touch operation from the user.

8. An image forming system comprising:

an image forming apparatus including an image forming unit configured to form an image on a sheet, the image forming apparatus being capable of transitioning between a standby mode which is a power state enabling image forming to be performed and a sleep mode which is a power state less in power consumption than the standby mode; and a wireless operation device configured to accept an operation from a user, the wireless operation device being capable of wireless communication with the image forming apparatus, the wireless operation device including:

a display configured to display information;

a battery configured to supply a power in order to drive the wireless operation device; and a controller configured to switch an operation mode of the wireless operation device between a first power mode and a second power mode less in power consumption than the first power mode, wherein, in response to transition of the image forming apparatus from the standby mode to the sleep mode, the controller switches the operation mode from the first power mode to the second power mode.

9. The image forming system according to claim 8, wherein when the wireless operation device performs the first power mode, the display is on in lighting by the power supply from the battery, and when the wireless operation device performs the second power mode, the display is off in lighting because of no power supply from the battery.

10. The image forming system according to claim 8, further comprising:

a first communication portion provided in the image forming apparatus; and a second communication portion provided in the wireless operation device, the second communication portion enabling wireless communication with the first communication portion, wherein, in response to transition of the image forming apparatus from the standby mode to the sleep mode, a control signal is transmitted from the first communication portion to the second communication portion, and wherein, in a case where the second communication portion receives the control signal, the controller switches the operation mode from the first power mode to the second power mode.

11. The image forming system according to claim 8, wherein the controller causes the operation mode to transition from the first power mode to the second power mode when a first predetermined time elapses with the wireless operation device remaining unoperated, with the image forming apparatus in the standby mode, and causes, after the image forming apparatus transitions from the standby mode to the sleep mode, the operation mode to transition from the first power mode to the second power mode when elapsed time after the transition exceeds a second predetermined time shorter than the first predetermined time with the wireless operation device remaining unoperated.

12. The image forming system according to claim 8, wherein the wireless operation device includes a first operation mode and a second operation mode, the controller switching the operation mode from the first power mode to the second power mode in response to transition of the image forming apparatus from the standby mode to the sleep mode in the state where the wireless operation device is in the first power mode, and the controller not switching the operation mode from the first power mode to any power mode in response to the transition of the image forming apparatus from the standby mode to the sleep mode in the state where the wireless operation device is in the second power mode.

13. The image forming system according to claim 8, wherein the wireless operation device includes a detection portion configured to detect a remaining level of the battery, and wherein, in a case where the remaining level of the battery is less than a predetermined level and the image forming apparatus transitions from the standby mode to the sleep mode, the controller switches the operation mode from the first power mode to the second power mode, and wherein, in a case where the remaining level of the battery is the predetermined level or more and the image forming apparatus transitions from the standby mode to the sleep mode, the controller does not switch the operation mode from the first power mode to any power mode.

14. The image forming system according to claim 8, wherein the image forming apparatus includes a mount portion on which the wireless operation device is mountable, and wherein the battery is charged in a state where the wireless operation device is mounted on the mount portion.

15. The image forming system according to claim 8, wherein the display is a touch panel configured to accept a touch operation from the user.

16. A wireless operation device configured to operate, via wireless communication, an image forming apparatus including an image forming unit configured to form an image on a sheet, the image forming apparatus being capable of transitioning between a standby mode which is a power state enabling image forming to be performed and a sleep mode which is a power state less in power consumption than the standby mode, the wireless operation device comprising:

a display configured to display information;

a battery configured to perform power supply to the display such that the display lights up;

a controller configured to control the power supply from the battery to the display; and a second communication portion enabling wireless communication with a first communication portion provided in the image forming apparatus, wherein, in response to transition of the image forming apparatus from the standby mode to the sleep mode, a control signal is transmitted from the first communication portion to the second communication portion, and wherein, the controller saves an amount of power to be supplied from the battery to the display based on receiving the control signal.

17. The wireless operation device according to claim 16, wherein in response to transition of the image forming apparatus from the standby mode to the sleep mode in the state where the predetermined amount of power being supplied from the battery to the display, the controller stops the power supply from the battery to the display.

18. The wireless operation device according to claim 16, wherein the wireless operation device has a first mode in which the controller makes the supply amount of power from the battery to the display less than the predetermined amount in response to transition of the image forming apparatus from the standby mode to the sleep mode and a second mode in which the controller does not control the supply amount of power from the battery to the display in response to transition of the image forming apparatus from the standby mode to the sleep mode.

* * * * *